Figure 1:
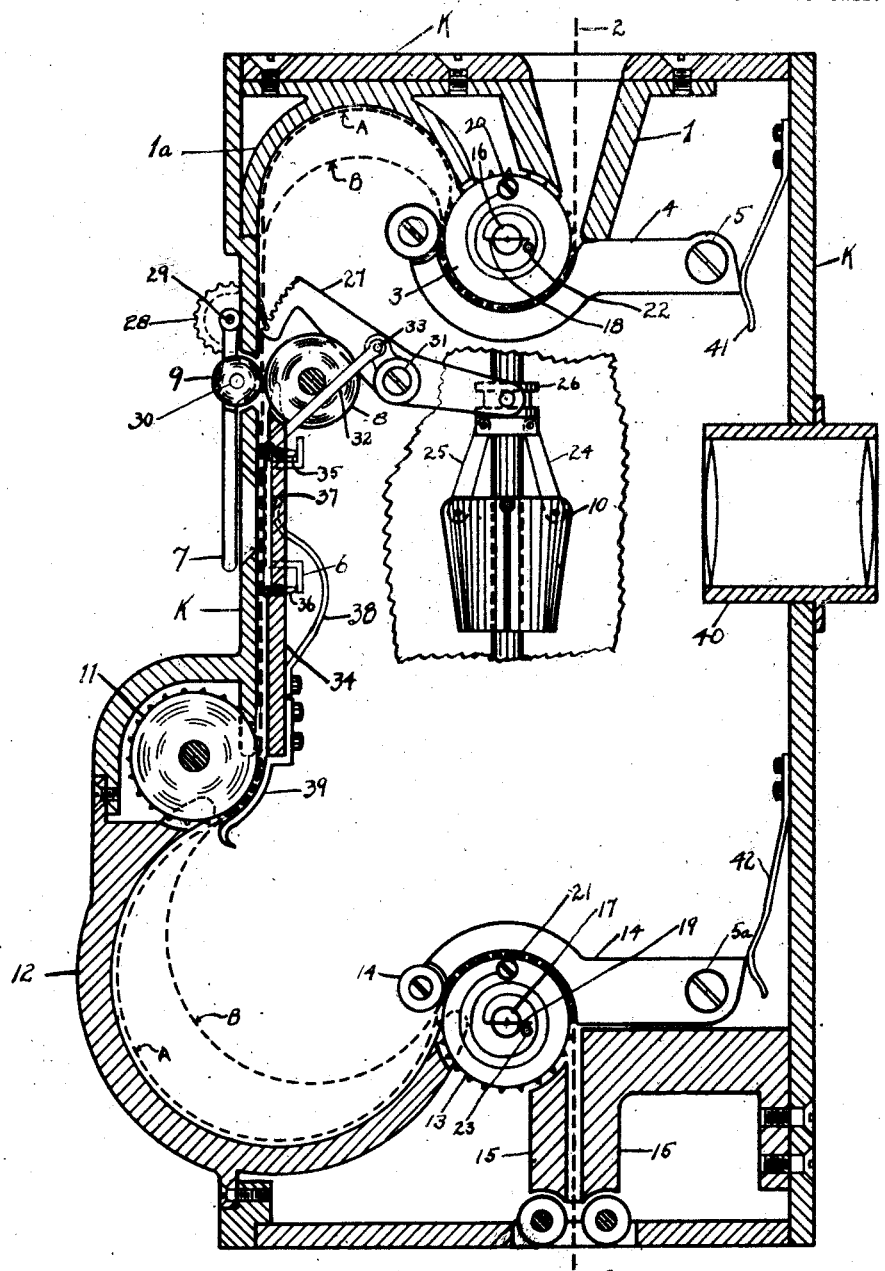

W. WENDERHOLD.
AUTOMATIC FILM THREADER.
APPLICATION FILED SEPT. 27, 1915.

1,361,123.

Patented Dec. 7, 1920.
3 SHEETS—SHEET 3.

WITNESSES:

INVENTOR
William Wenderhold
BY
ATTORNEY

UNITED STATES PATENT OFFICE.

WILLIAM WENDERHOLD, OF NEW YORK, N. Y., ASSIGNOR TO CRU PATENTS CORPORATION, A CORPORATION OF NEW YORK.

AUTOMATIC FILM-THREADER.

1,361,123.  Specification of Letters Patent.  Patented Dec. 7, 1920.

Application filed September 27, 1915. Serial No. 52,896.

*To all whom it may concern:*

Be it known that I, WILLIAM WENDERHOLD, a citizen of the United States, residing at New York city, in the county and State of New York, have invented certain new and useful Improvements in Automatic Film-Threaders, of which the following is a clear, full, and exact description.

This invention relates to motion picture apparatus, but more particularly to the film feeding arrangements.

The object of this invention is to provide an arrangement whereby a film picture is directed automatically through the apparatus, eliminating the manual method of threading a film through a motion picture machine or any motion picture apparatus and bringing a film by mechanical means in proper position in said apparatus, insuring the utmost accuracy and speed.

Another object of this invention is to provide an automatic film threader which can easily be adjusted to any motion picture apparatus now in use. I have therefore used in my illustrations the general appearance of two motion picture projecting machines now on the market known as the "Simplex Projector" and the "Powers Projector."

As shown in the drawings,

Figure 1 is a diagrammatic illustration of a Simplex projector showing the automatic film threader constructed therein.

Figure 2:
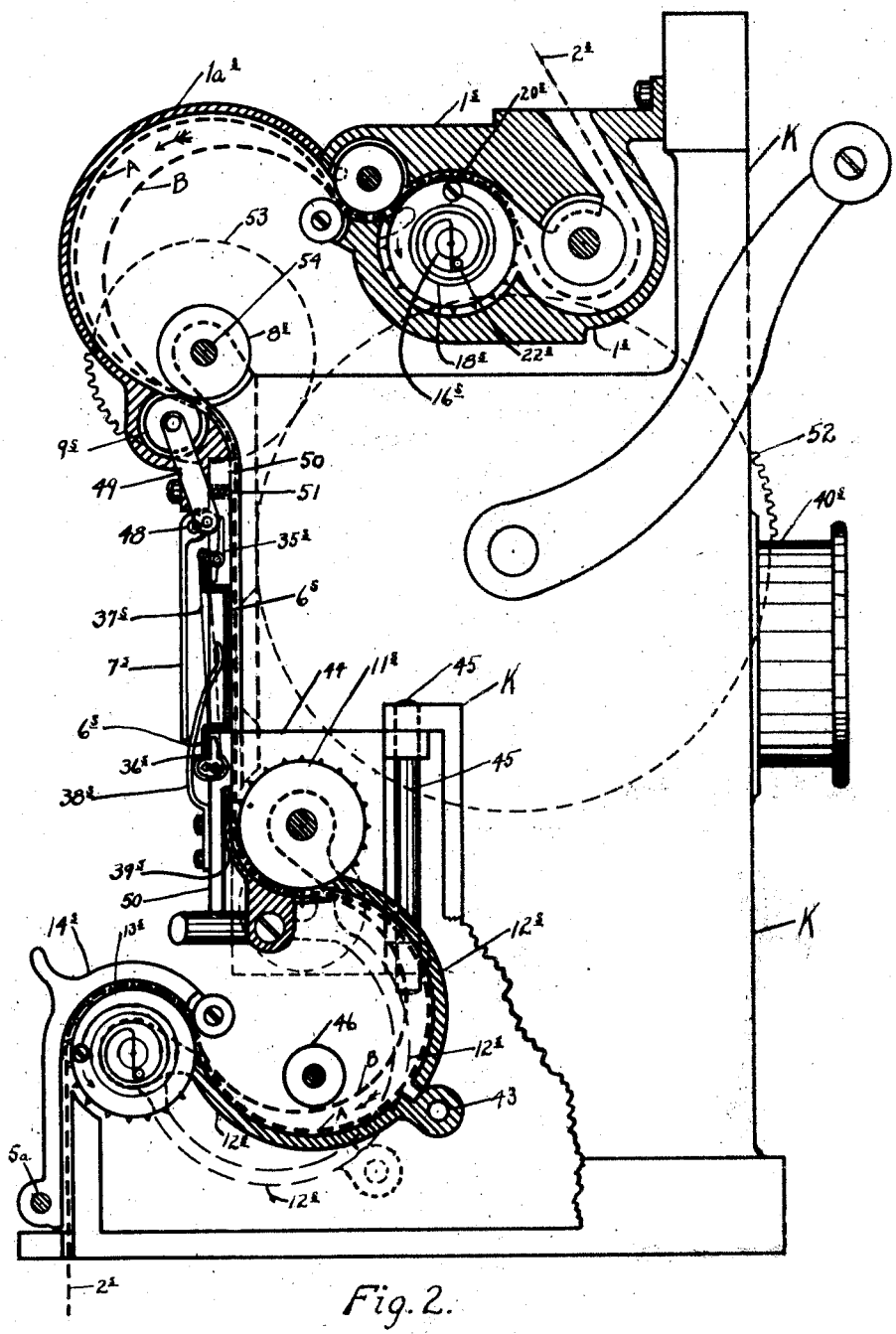

Fig. 2. is a diagrammatic illustration of my automatic film threader constructed in a power projector.

Figure 3:
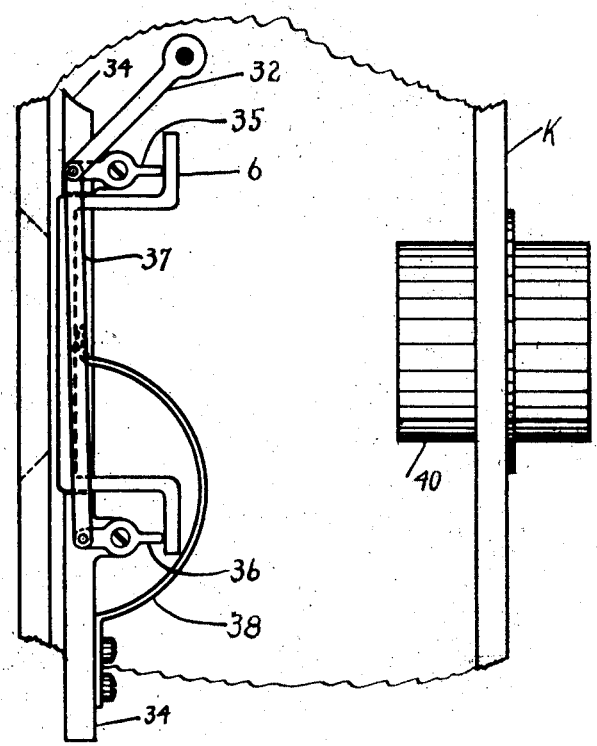

Fig. 3 is a sectional view of the aperture section.

To accomplish the object of my invention, I provide a fixed guide for the film 2 to the upper combination running sprocket 3 and an idler guide 4 pivotally mounted in the motion picture machine frame $k$ by screw 5. When the film is being delivered to sprocket 3 to be engaged by the teeth thereof, the film will be forced around the curved guide 1ª and from there down to the aperture gate. This aperture gate 6 is under tension to keep the film tight in the focal axis, and therefore the film as outlined in dotted line A could not force its way through efficiently. I therefore have provided means, automatic in its operation, to open the tension guide 6 by the mere operation of the usual governor arrangement used in motion picture machines to operate a so-called fire shutter 7.

Where the aforesaid arrangement is not convenient I arrange auxiliary feed rollers 8 and 9 in close proximity to the aperture tension gate 6. The feed roller 8 is connected with and is constantly driven by the driving mechanism of the motion picture machine. The roller 9, however, is yieldably mounted in swinging frame 7 which is also the fire shutter and under the influence of the speed governor 10, so that when the machine operates under normal speed, the feed roller 9 is carried away from the feed roller 8. Therefore, this auxiliary feed has no longer any effect upon the film strip, which has now reached the usual intermittent feed roller 11 and which will deliver the film by the lower film guide 12, the film taking the position therein as indicated by $a$. The film will then reach the lower or so called take-up sprocket 13 and being engaged thereby will be carried past the idler guide 14 into the guides 15 for the film leading to the usual lower take-up magazine. The film is now threaded through the motion picture machine, but not in the proper position and must be brought into the position as indicated by the letter B, so that the loops of the film are freely suspended in the guides 1ª and 12. This is accomplished by mounting the usual upper and lower continuously running feed sprockets flexibly on their respective shafts 16 and 17 by the arrangement of a spring 18 and spring 19 so that the film on the upper sprocket can exert a backward motion upon the sprocket 3. When the film 2 is being delivered under tension from the usual upper film magazines, the springs 18 and 19 each pass through their respective shafts 16 and 17 and are connected with their respective sprockets 3 and 13 by screws 20 and 21. The amount of yielding by the sprocket is fixed by the pins 22 and 23, which strike the wire springs 19 and 18, thus reducing the amount of film originally delivered or contained in the film guides 1ª and 12. The only difference in the arrangement for the lower sprocket is that the sprocket 13 is pulled forward by the tension on the film from the take-up device in a motion picture machine and the upper sprocket is pulled in a backward direction by the usual tension on the upper reel. If for any reason whatsoever a backward pull on the upper sprocket 3 is not permissible, then the sprocket 3 can be fixedly mounted on the shaft 16 to reduce the film loop from A to B in the guide 1ª. The rollers 8 and 9 can then perform that function by so arranging them that the speed of the roller 8 will furnish slightly more film to the intermittent sprocket 11. When the sprocket 3 delivers the film into the guide 1ª the roll 8, having no teeth, will not be able to affect the film movement after the sprocket 11 has engaged the film, and especially not when the roller 9 is carried away from the film upon operating the motion picture machine at a normal speed.

I will now describe more explicitly the operation by which the tension gate 6 is opened. The object is to keep this tension gate away from the film when the apparatus is not in normal operation. To accomplish this I utilize preferably the usual governor in a motion picture machine used for opening a fire shutter or the like. The governor 10 is driven by the motion picture machine mechanism. In fact, it is a part thereof. The arms 24 and 25 shift the collar 26. This collar operates the lever 27 which has teeth at one end to engage gear 28, which is mounted on shaft 29. This shaft is also the pivotal point for the fire shutter 7, in which is mounted the idler roller 9, on shaft 30. It will be readily seen that as soon as the governor raises the fire shutter the roller 9 is carried with it. The lever 27 is pivotally mounted in the motion picture machine frame $k$ by stud screw 31, and the link 32 is operated also by lever 27 at point 33. In the aperture door 34 are mounted two small levers 35 and 36. They are connected with each other by the arm 37 and are operated by link 32. The small levers 36 and 35 lift the tension gate 6 whenever the apparatus is below normal speed or at a standstill as the speed governor controls the operation of the same. The flat spring 38 furnishes the tension for the gate 6. 39 is a guide around the intermittent sprocket and 40 is the projecting lens. 41 and 42 are flat springs for the idler guides 4 and 14.

All the operations heretofore described take place upon mere rotation of the motion picture machines. I have also described the conditions prevalent in motion picture machines where the film sprockets maintain at all times a fixed distance between the intermittent sprocket and a continuously driven sprocket and the automatic film threader as so described in my specification is adaptable to such projectors as the "Edison," "Simplex," "Baird," "Powers" and others of similar type, too numerous mention.

I will now describe another system such as the Power Projector, the "Motiograph" and "Standard." In adapting my automatic film threader to this type of projector I have used for the illustration in Fig. 2 the general outline of a Power projector with such alteration as seemed advantageous to my purpose. The type of this projector differs from others for the reason that the intermittent sprocket $11^s$ is shifted to and from the aperture for the purpose of framing the picture. Therefore the distance between the sprocket $13^s$ and $11^s$ changes and therefore the film guide $12^s$ must be so arranged as to enable automatic threading regardless of the distance between the aforementioned sprockets $13^s$ and $11^s$. I have therefore provided the guide $12^s$ in two parts hinged together with pin 43 and the outer ends of the guides $12^s$ are pivotally fastened on or about the center point of the sprockets $11^s$ and $13^s$. The dotted outlines show guides $12^s$ is lowest position. The sprocket $11^s$ is usually mounted in a shiftable frame 44 sliding up and down on bar 45 and said bar 45 is carried by the stationary frame of the motion picture machine K. The roller 46 has nothing to do with my invention and is only shown to illustrate that this automatic threader does not interfere with the yieldably mounted roller 46 which operates a loop repairer as used in the Power projector.

I have now described the automatic threader and its form for this type of apparatus. The operation of the other functions are practically the same as illustrated in Fig. 1, only that the various roller guides and sprockets are located in somewhat different positions. I do not show the governor in Fig. 2 but character 48 denotes the regular shaft carrying a fire shutter in the Power machine. Therefore, if that fire shutter is closed as shown in Fig. 2 then the link 49 forces the roller $9^s$ against $8^s$ and link 49 also operates the two small levers $35^s$ and $36^s$. They are connected with each other by connecting bar $37^s$ and tend to lift the guides away from the film. $39^s$ is a pivotally mounted guide around the sprocket $11^s$ and is fastened in the sliding frame 44. Guide $1^{as}$ is fastened to the door 50 of the motion picture machine by screw 51. The gear 52 is the main driving gear of the Power motion picture machine and gear 53, shown by the dotted lines, is mounted on the shaft 54, which also carries $8^s$, the auxiliary feed roller. Similar driving connections can be used in Fig. 1. The governor arrangement of Fig. 1 can be used in Fig. 2 also. All the numerals in Fig. 1 are marked in Fig. 2, but with an addition of the letter "s" to every number, which is in both illustrations.

Considerable changes can be made without altering the principles of the invention. My object has been to outline in a simple manner how my invention can be adapted to any motion picture apparatus and will eliminate the heretofore guess method of threading a film through a motion picture machine or a similar apparatus.

What I claim is:

1. The combination with a motion picture projecting apparatus, a film inlet and a film outlet therefor, a tension gate, and means for presenting a film in said inlet and means operated by the operation of said projecting apparatus for automatically passing said film by said gate to said outlet and means for controlling the tension of said gate by the speed of operation of said apparatus.

2. A device for threading a film into and through a motion picture apparatus comprising a feed wheel, guides associated therewith, a tension gate, said guides delivering to said tension gate, means for presenting the film to said feed wheel, and means for operating said feed wheel and for controlling the tension of said gate in accordance with the speed of operation of said wheel.

3. A film threading device comprising in combination, a normally closed film gate, a guide delivering to said gate a feed wheel delivering to said guide, a second guide and feed wheel, means for operating said feed wheels, and means for presenting a film to said first mentioned feed wheel, and means controlled by the operation of said feed wheel operating means for opening said gate.

4. A film threading device comprising in combination, a film gate, a guide delivering to said gate, a feed wheel delivering to said guide, a second guide and feed wheel, means for operating said feed wheels, means controlled by the speed of operation of said feed wheels for controlling the tension on said gate, and means for presenting a film to said first mentioned feed wheel.

5. An automatic film threading device comprising feed rollers, automatically variable guides and adjustable guides all associated with said feed rollers, means for presenting a film to one of said feed rollers, and means for actuating said rollers.

6. In a device of the class described, the combination with a feed roller of means for actuating said feed roller and means controlled by the actuation thereof for varying the position of said roller to decrease the tension imposed thereon in its feeding operation.

7. The combination with a motion picture apparatus, of means for threading a film therethrough comprising fixed and shiftable feed sprockets, a guide between said sprockets and means for maintaining the space between said sprockets constant.

8. The combination with a motion picture apparatus, of means for threading a film therethrough comprising fixed and shiftable feed sprockets, a guide between said sprockets and means for shifting said guide in accordance with the movement of said shiftable sprocket, for maintaining the space between said sprockets constant.

Signed at New York, N. Y., this 25th day of September one thousand nine hundred and fifteen.

WILLIAM WENDERHOLD.

Witnesses:
 ROBERT RICHTER,
 FRED FERENS.